(12) United States Patent
Hebert et al.

(10) Patent No.: US 8,032,327 B2
(45) Date of Patent: Oct. 4, 2011

(54) AUTO-REFERENCED SENSING METHOD FOR THREE-DIMENSIONAL SCANNING

(75) Inventors: Patrick Hebert, Québec (CA); Éric Saint-Pierre, Lévis (CA); Dragan Tubic, Québec (CA)

(73) Assignee: Creaform Inc., Levis, Quebec (CA)

( * ) Notice: Subject to any disclaimer, the term of this patent is extended or adjusted under 35 U.S.C. 154(b) by 0 days.

(21) Appl. No.: 12/959,532

(22) Filed: Dec. 3, 2010

(65) Prior Publication Data

US 2011/0074930 A1    Mar. 31, 2011

Related U.S. Application Data

(63) Continuation of application No. 11/817,300, filed as application No. PCT/CA2006/000370 on Mar. 13, 2006, now Pat. No. 7,912,673.

(60) Provisional application No. 60/660,471, filed on Mar. 11, 2005.

(51) Int. Cl.
*G01C 9/00* (2006.01)
*G01B 11/30* (2006.01)
*G06K 9/36* (2006.01)

(52) U.S. Cl. .......................... 702/153; 356/603; 382/285

(58) Field of Classification Search .................. 702/153, 702/81, 84–85, 94–95, 127, 150, 152, 155–159, 702/167–168, 189; 382/108, 154, 190, 276, 382/285, 291, 295, 312–313, 318, 321; 356/4.01, 356/4.03, 601–603, 606–608, 610, 612, 614, 356/620–623; 348/47, E13.02, E13.074
See application file for complete search history.

(56) References Cited

U.S. PATENT DOCUMENTS

| | | |
|---|---|---|
| 4,645,348 A | 2/1987 | Dewar et al. |
| 5,410,141 A | 4/1995 | Knoeck et al. |
| 5,661,667 A | 8/1997 | Rueb et al. |
| 6,101,455 A | 8/2000 | Davis |

(Continued)

FOREIGN PATENT DOCUMENTS

DE    19502459    8/1996

(Continued)

OTHER PUBLICATIONS

P. Hebert, "A Self-Referenced Hand-Held Range Sensor", in proc. of the 3rd International Conference on 3D Digital Imaging and Modeling (3DIM 2001), May 28-Jun. 1, 2001, Quebec City, Canada, pp. 5-12).

(Continued)

*Primary Examiner* — Mohamed Charioui
*Assistant Examiner* — Toan Le
(74) *Attorney, Agent, or Firm* — Fasken Martineau

(57) ABSTRACT

A method for obtaining three-dimensional surface points of an object in an object coordinate system having two groups of steps. The method includes providing a set of target positioning features on the object. In a first group of steps, acquiring 2D first images of the object, extracting 2D positioning features; calculating a first set of calculated 3D positioning features; computing first transformation parameters, cumulating the first set of transformed 3D positioning features to provide and augment the set of reference 3D positioning features. In a second group of steps, providing a projected pattern on a surface of the object; acquiring 2D second images of the object, extracting 2D surface points and second sets of 2D positioning features; calculating a set of 3D surface points; calculating a second set of calculated 3D positioning features; computing second transformation parameters, transforming the 3D surface points into transformed 3D surface points.

5 Claims, 3 Drawing Sheets

U.S. PATENT DOCUMENTS

| | | | |
|---|---|---|---|
| 6,246,468 | B1 | 6/2001 | Dimsdale |
| 6,508,403 | B2 | 1/2003 | Arsenault et al. |
| 6,542,249 | B1 | 4/2003 | Kofman et al. |
| 7,487,063 | B2 | 2/2009 | Tubic et al. |
| 7,912,673 | B2 * | 3/2011 | Hebert et al. ............. 702/153 |
| 2002/0041282 | A1 | 4/2002 | Kitaguchi et al. |
| 2008/0201101 | A1 | 8/2008 | Hebert et al. |

FOREIGN PATENT DOCUMENTS

| | | |
|---|---|---|
| DE | 19634254 | 3/1997 |
| DE | 19925462 | 2/2001 |
| JP | 04172213 | 6/1992 |
| JP | 07012534 | 1/1995 |
| JP | 11101623 | 4/1999 |
| JP | 2001119722 | 4/2001 |
| WO | 0114830 | 3/2001 |
| WO | 0169172 | 9/2001 |
| WO | 03062744 | 7/2003 |

OTHER PUBLICATIONS

F. Blais, "A Review of 20 Years of Range Sensor Development", in proceedings of SPIE-IS&T Electronic Imaging, SPIE vol. 5013, 2003, pp. 62-76.

S. Rusinkiewicz et al., "Real-Time 3D Model Acquisition", in ACM Transactions on Graphics, vol. 21, No. 3, Jul. 2002, pp. 438-446.

F. Blais et al., "Accurate 3D Acquisition of Freely Moving Objects", in proc. of the Second International Symposium on 3D Date Processing, Visualization and Transmission, Sep. 6-9, 2004, NRC 47141, Thessaloniki, Greece.

J.Y. Bouguet et al., 3D Photography Using Shadows in Dual-Space Geometry, Int. Journal of Computer Vision, vol. 35, No. 2, Nov.-Dec. 1999, pp. 129-149.

M.W. Walker et al., "Estimating 3-D location parameters using dual numbers quaternions", CVGIP : Image Understanding, Nov. 1991, vol. 54, No. 3, pp. 358-367.

E. Trucco et al., Introductory techniques for 3-D computer vision, Prentice Hall, 1998, p. 101-108.

M. Fischler et al., "Random sample consensus : A paradigm for model fitting with applications to image analysis and automated cartography", Communications of the Assoc. for Computing Machinery, Jun. 1981, vol. 24, No. 6, pp. 381-395.

C. Reich et al., "3-D shape measurement of complex objects by combining photogrammetry and fringe projection", Optical Engineering, Society of Photo-Optical Instrumentation Engineers, vol. 39 (1) Jan. 2000, pp. 224-231, USA.

Pappa et al., "Dot-Projection Photogrammetry and Videogrammetry of Gossamer Space Structures", NASA/TM-2003-212146, Jan. 2003, Langley Research Center, Hampton, Virginia 23681-2199.

GOM mbH: Products—Tritop—3d-Coordinate Measurement Technique using Photogrammetry, description available at http://www.gom-online.de/En/Products/tritop.html, Mar. 8, 2006.

* cited by examiner

AUTO-REFERENCED SENSING METHOD FOR THREE-DIMENSIONAL SCANNING

CROSS-REFERENCE TO RELATED APPLICATIONS

The present application is a continuation of U.S. patent application Ser. No. 11/817,300 filed Aug. 28, 2007 by Applicant, now U.S. Pat. No. 7,912,673, which is a national phase entry of PCT patent application no. PCT/CA06/00370 filed on Mar. 13, 2006, which in turns claims priority benefit on U.S. provisional patent application No. 60/660,471 filed Mar. 11, 2005, the specifications of which are hereby incorporated by reference.

TECHNICAL FIELD

The present invention generally relates to the field of three-dimensional scanning of an object's surface geometry, and, more particularly, to a portable three-dimensional scanning apparatus for hand-held operations.

BACKGROUND OF THE INVENTION

Three-dimensional scanning and digitization of the surface geometry of objects is now commonly used in many industries and services and their applications are numerous. A few examples of such applications are: inspection and measurement of shape conformity in industrial production systems, digitization of clay models for industrial design and styling applications, reverse engineering of existing parts with complex geometry, interactive visualization of objects in multimedia applications, three-dimensional documentation of artwork and artifacts, human body scanning for better orthesis adaptation or biometry.

There remains a need to improve the scanning devices used for 3D scanning of an object.

SUMMARY OF THE INVENTION

According to one broad aspect, there is provided a method for obtaining three-dimensional surface points of an object in an object coordinate system having two groups of steps. The method first comprises providing a set of target positioning features on the object, each of the target positioning features being provided at a fixed position on the object, the object coordinate system being defined using the target positioning features, the target positioning features being provided by one of a set of external fixed projectors projecting the features and fixedly secured features.

In one embodiment, the method comprises, in a first group of steps acquiring at least a pair of 2D first images of the object by at least a pair of cameras, at least a first portion of the set of target positioning features being apparent on the pair of first images, each pair of the 2D first images being acquired from a corresponding first pair of viewpoints referenced in a sensing device coordinate system; using an electronic chip in communication with the at least the pair of cameras for implementing the steps of: extracting, from the 2D first images, at least two first sets of 2D positioning features from a reflection of the target positioning features of the first portion on the surface; calculating a first set of calculated 3D positioning features in the sensing device coordinate system using the first sets of 2D positioning features; computing first transformation parameters for characterizing a current spatial relationship between the sensing device coordinate system and the object coordinate system, by matching corresponding features between the first set of calculated 3D positioning features in the sensing device coordinate system and a set of reference 3D positioning features in the object coordinate system, the reference 3D positioning features being cumulated from previous observations; transforming the first set of calculated 3D positioning features into a first set of transformed 3D positioning features in the object coordinate system using the first transformation parameters; cumulating the first set of transformed 3D positioning features to provide and augment the set of reference 3D positioning features.

In one embodiment, the method comprises, in a second group of steps, providing a projected pattern on a surface of the object using a pattern projector; acquiring at least a pair of 2D second images of the object by the cameras, the projected pattern and at least a second portion of the set of target positioning features being apparent on the pair of second images, each pair of the 2D second images being acquired from a corresponding second pair of viewpoints referenced in the sensing device coordinate system; wherein the first portion of the set of target positioning features and the second portion of the set of target positioning features being one of the same, partly the same and different; using the electronic chip for implementing the steps of: extracting, from the 2D second images, at least one set of 2D surface points from a reflection of the projected pattern on the surface, and at least two second sets of 2D positioning features from a reflection of the target positioning features of the second portion on the surface; calculating a set of 3D surface points in the sensing device coordinate system using the set of 2D surface points; calculating a second set of calculated 3D positioning features in the sensing device coordinate system using the second sets of 2D positioning features; computing second transformation parameters for characterizing a current spatial relationship between the sensing device coordinate system and the object coordinate system, by matching corresponding features between the second set of calculated 3D positioning features in the sensing device coordinate system and the set of reference 3D positioning features in the object coordinate system; transforming the set of 3D surface points into a set of transformed 3D surface points in the object coordinate system using the second transformation parameters.

According to another broad aspect, there is provided a method for obtaining three-dimensional surface points of an object in an object coordinate system having two groups of steps. The method first comprises providing a set of target positioning features on the object. In a first group of steps, acquiring at least a pair of 2D first images of the object, at least a first portion of the set of target positioning features being apparent on the pair of first images, extracting, from the 2D first images, at least two first sets of 2D positioning features from a reflection of the target positioning features of the first portion on the surface; calculating a first set of calculated 3D positioning features in the sensing device coordinate system using the first sets of 2D positioning features; computing first transformation parameters for characterizing a current spatial relationship between the sensing device coordinate system and the object coordinate system, cumulating the first set of transformed 3D positioning features to provide and augment the set of reference 3D positioning features. In a second group of steps, providing a projected pattern on a surface of the object using a pattern projector; acquiring at least a pair of 2D second images of the object by the cameras, the projected pattern and at least a second portion of the set of target positioning features being apparent on the pair of second images, extracting, from the 2D second images, at least one set of 2D surface points from a reflection of the projected pattern on the surface, and at least two second sets of 2D positioning features from a reflection of the target positioning features of the second portion on the surface; calculating a set of 3D surface points in the sensing device coordinate system using the set of 2D surface points; calculating a second set of calculated 3D positioning features in the sensing device coordinate system using the second sets of 2D positioning features; computing second transformation parameters for characterizing a current spatial relationship between the sensing device coordinate system and the object coordinate system, transforming the set of 3D surface points into a set of transformed 3D surface points in the object coordinate system using the second transformation parameters.

According to another broad aspect, there is provided a method for obtaining three-dimensional surface points of an object in an object coordinate system. The method comprises providing a projected pattern on a surface of the object using a pattern projector; providing a set of target positioning features on the object, each of the target positioning features being provided at a fixed position on the object, the object coordinate system being defined using the target positioning features, the target positioning features being provided by one of a set of external fixed projectors projecting the features and affixed features; acquiring at least a pair of 2D images of the object by at least a pair of cameras with a known spatial relationship, the projected pattern and at least a portion of the set of target positioning features being apparent on the images, each of the 2D images being acquired from a view point referenced in a sensing device coordinate system; using an electronic chip in communication with the at least the pair of cameras for implementing the steps of: extracting, from the 2D images, at least one set of 2D surface points from a reflection of the projected pattern on the surface, and at least two sets of 2D positioning features from a reflection of the target positioning features on the surface; calculating a set of 3D surface points in the sensing device coordinate system using the set of 2D surface points; calculating a set of calculated 3D positioning features in the sensing device coordinate system using the sets of 2D positioning features; computing transformation parameters for characterizing a current spatial relationship between the sensing device coordinate system and the object coordinate system, by matching corresponding features between the set of calculated 3D positioning features in the sensing device coordinate system and a set of reference 3D positioning features in the object coordinate system, the reference 3D positioning features being cumulated from previous observations; and transforming the set of 3D surface points into a set of transformed 3D surface points in the object coordinate system using the transformation parameters.

In one embodiment, the electronic chip further implements the steps of: transforming the set of calculated 3D positioning features into a set of transformed 3D positioning features in the object coordinate system using the transformation parameters; and cumulating the set of transformed 3D positioning features to provide and augment the set of reference 3D positioning features.

According to another broad aspect, there is provided a system for obtaining three-dimensional surface points of an object in an object coordinate system. The system comprises a set of target positioning features on the object, each of the target positioning features being provided at a fixed position on the object, the object coordinate system being defined using the target positioning features; a sensing device having a pattern projector for providing a projected pattern on a surface of the object, at least a pair of cameras each for acquiring at least one 2D image of the object, each of the 2D images being acquired from a viewpoint referenced in a sensing device coordinate system; an image processor for extracting, from the 2D images, at least one set of 2D surface points from a reflection of the projected pattern on the surface apparent on the images, and at least two sets of 2D positioning features from a reflection of at least a portion of the target positioning features on the surface apparent on the images; a 3D surface point calculator for calculating a set of 3D surface points in the sensing device coordinate system using the set of 2D surface points; a 3D positioning feature calculator for calculating a set of calculated 3D positioning features in the sensing device coordinate system using the sets of 2D positioning features; a positioning features matcher for computing transformation parameters to characterize a current spatial relationship between the sensing device coordinate system and the object coordinate system, by matching corresponding features between the set of calculated 3D positioning features in the sensing device coordinate system and a set of reference 3D positioning features in the object coordinate system, the reference 3D positioning features being cumulated from previous observations; a 3D surface point transformer for transforming the set of 3D surface points into a set of transformed 3D surface points in the object coordinate system using the transformation parameters.

BRIEF DESCRIPTION OF THE DRAWINGS

Having thus generally described the nature of the invention, reference will now be made to the accompanying drawings, showing by way of illustration a preferred embodiment thereof, and in which.

DETAILED DESCRIPTION OF THE PREFERRED EMBODIMENTS

The present device allows simultaneously scanning and modeling the object's surface while accumulating a second model of the positioning features in real-time using a single hand-held sensor. Furthermore, by fixing additional physical targets as positioning features on an object, it is possible to hold the object in one hand while holding the scanner in the second hand without depending on the object's surface geometry for the quality of the calculated sensor positions.

Figure 1:
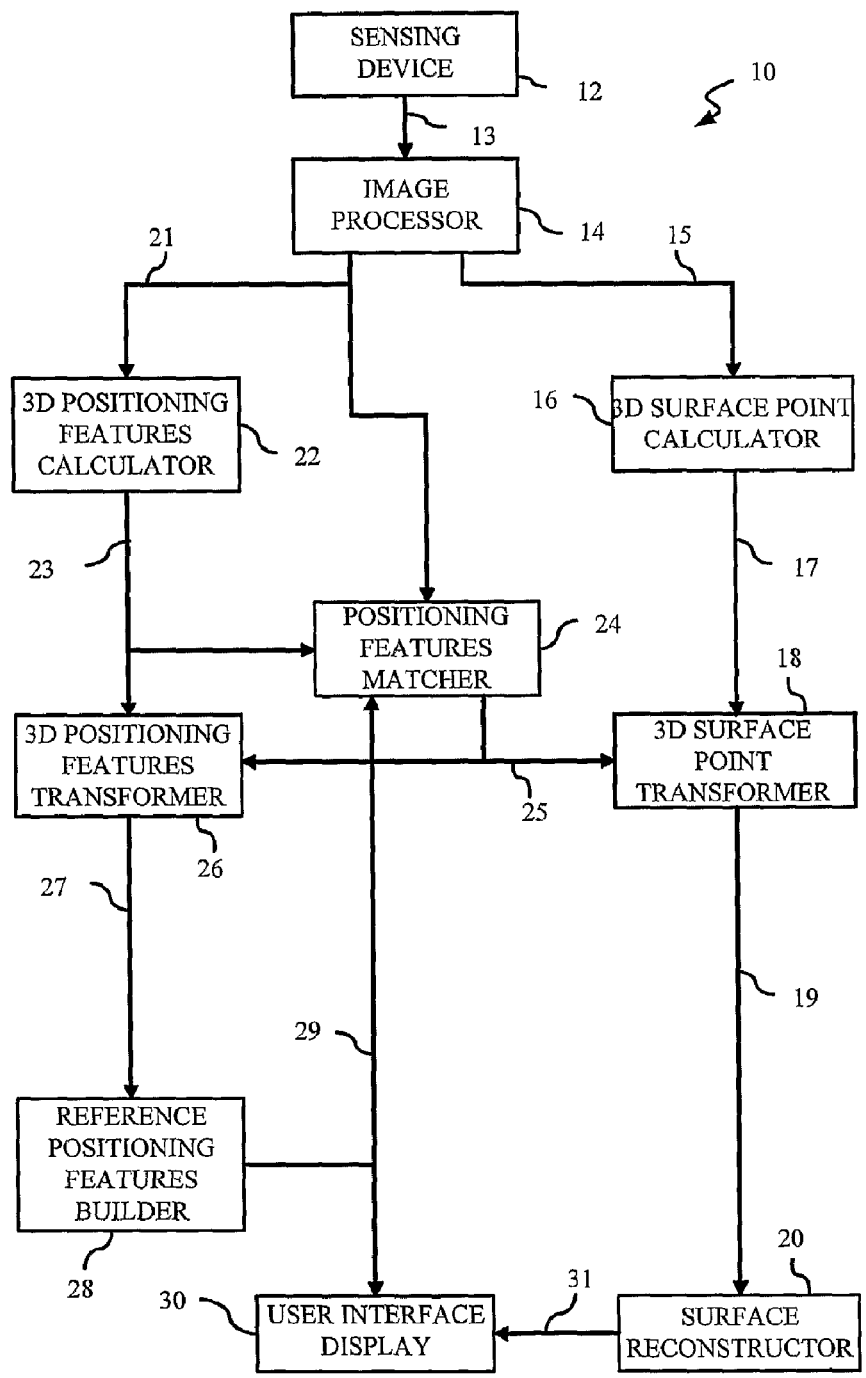
FIG. 1 is a block diagram illustrating a system for three-dimensional surface scanning in accordance with the present invention.

Referring to FIG. 1, the 3D surface scanning system is generally shown at 10.

Sensing Device

The system comprises a sensing device 12 described in more details thereafter in this description. The sensing device 12 collects and transmits a set of images 13, namely a frame, of the observed scene to an image processor 14. These images are collected from at least two viewpoints where each of these viewpoints has its own center of projection. The relevant information encompassed in the images results from the laser projection pattern reflected on the object's surface as well as positioning features that are used to calculate the relative position of the sensing device with respect to other frame captures. Since all images in a given frame, are captured simultaneously and contain both positioning and surface measurements, synchronisation of positioning and surface measurement is implicit.

The positioning features are secured on the object such that the object can be moved in space while the positioning features stay still on the object and, accordingly, with respect to the object's coordinate system. It allows the object to be moved in space while its surface is being scanned by the sensing device.

Image Processor

The image processor 14 extracts positioning features and surface points from each image. For each image, a set of 2D surface points 15 and a second set of observed 2D positioning features 21 are output. These points and features are identified in the images based on their intrinsic characteristics. Positioning features are either the trace of isolated laser points or circular retro-reflective targets. The pixels associated with these features are contrasting with respect to the background and may be isolated with simple image processing techniques before estimating their position using centroïd or ellipse fitting (see E. Trucco and A. Verri, "Introductory techniques for 3-D computer vision", Prentice Hall, 1998, p. 101-108). Using circular targets allows one to extract surface normal orientation information from the equation of the fitted ellipse, therefore facilitating sensing device positioning. The sets of surface points are discriminated from the positioning features since the laser pattern projector produces contrasting curve sections in the images and thus presenting a different 2D shape. The image curve sections are isolated as single blobs and for each of these blobs, the curve segment is analyzed for extracting a set of points on the curve with sub-pixel precision. This is accomplished by convolving a differential operator across the curve section and interpolating the zero-crossing of its response.

For a crosshair laser pattern, one can benefit from the architecture of the apparatus described thereafter. In this configuration with two cameras and a crosshair pattern projector, the cameras are aligned such that one among the two laser planes produces a single straight line in each camera at a constant position. This is the inactive laser plane for a given camera. These inactive laser planes are opposite for both cameras. This configuration, proposed by Hébert (see P. Hébert, "A Self-Referenced Hand-Held Range Sensor". in proc. of the 3rd International Conference on 3D Digital Imaging and Modeling (3DIM 2001), 28 May-1 Jun. 2001, Quebec City, Canada, pp. 5-12) greatly simplifies the image processing task. It also simplifies the assignation of each set of 2D surface point to a laser plane of the crosshair.

While the sets of surface points 15 follow one path in the system to recover the whole scan of the surface geometry, the sets of observed 2D positioning features 21 follow a second path and are used to recover the relative position of the sensing device with respect to the object's surface. However, these two types of sets are further processed for obtaining 3D information in the sensing device coordinate system.

3D Positioning Features Calculator

Since the sensing device is calibrated, matched positioning features between camera viewpoints are used to estimate their 3D position using the 3D positioning features calculator 22. The sets of observed 2D positioning features are matched using the epipolar constraint to obtain non ambiguous matches. The epipolar lines are calculated using the fundamental matrix that is calculated from the calibrated projection matrices of the cameras. Then, from the known projection matrices of the cameras, triangulation is applied to calculate a single set of calculated 3D positioning features in the sensing device coordinate system 23. This set of points will be fed to the positioning features matcher for providing the observation on the current state of the sensing device, and to the 3D positioning features transformer for an eventual update of the reference 3D positioning features in the object coordinate system.

3D Surface Point Calculator

The 3D surface point calculator 16 takes as input the extracted sets of 2D surface points 15. These points can be associated with a section of the laser projected pattern, for instance one of the two planes for the crosshair pattern. When the association is known, each of the 2D points can be transformed into a 3D point in the sensing device coordinate system by intersecting the corresponding cast ray and the equation of the laser plane. The equation of the ray is obtained from the projection matrix of the associated camera. The laser plane equation is obtained using a pre-calibration procedure (see P. Hébert, "A Self-Referenced Hand-Held Range Sensor". in proc. of the 3rd International Conference on 3D Digital Imaging and Modeling (3DIM 2001), 28 May-1 Jun. 2001, Quebec City, Canada, pp. 5-12) or exploiting a table look-up after calibrating the sensing device with an accurate translation stage for instance. Both approaches are adequate. In the first case, the procedure is simple and there is no need for sophisticated equipment but it requires a very good estimation of the cameras' intrinsic and extrinsic parameters.

It is also possible to avoid associating each 2D point to a specific structure of the laser pattern. This is particularly interesting for more complex or general patterns. In this case, it is still possible to calculate 3D surface points using the fundamental matrix and exploiting the epipolar constraint to match points. When this can be done without ambiguity, triangulation can be calculated in the same way it is applied by the 3D positioning features calculator 22.

The 3D surface point calculator 16 thus outputs a set of calculated 3D surface points in the sensing device coordinate system 17. This can be an unorganized set or preferably, the set is organized such that 3D points associated with connected segments in the images are grouped for estimating 3D curve tangent by differentiation. This information can be exploited by the surface reconstructor for improved quality of the recovered surface model 31.

Positioning Subsystem

The task of the positioning subsystem, mainly implemented in the positioning features matcher 24 and in the reference positioning features builder 28, is to provide transformation parameters 25 for each set of calculated 3D surface points 17. These transformation parameters 25 make it possible to transform calculated 3D surface points 17 into a single, object coordinate system while preserving the structure; the transformation is rigid. This is accomplished by building and maintaining a set of reference 3D positioning features 29 in the object coordinate system. The positioning features can be a set of 3D points, a set of 3D points with associated surface normal or any other surface characteristic. In this preferred embodiment it is assumed that all positioning features are 3D points, represented as column vectors [x, y, z]$^T$ containing three components denoting the position of the points along the three coordinate axes.

At the beginning of a scanning session, the set of reference 3D positioning features 29 is empty. As the sensing device 12 provides the first measurements and the system calculates sets of calculated 3D positioning features 23, the features are copied into the set of reference 3D positioning features 29 using the identity transformation. This set thus becomes the reference set for all subsequent sets of reference 3D positioning features 29 and this first sensing device position defines the object coordinate system into which all 3D surface points are aligned.

After creation of the initial set of reference 3D positioning features 29, subsequent sets of calculated 3D positioning features 23 are first matched against the reference set 29. The matching operation is divided into two tasks: i) finding corresponding features between the set of calculated 3D positioning features in the sensing device coordinate system 23 and the set of reference 3D features in the object coordinate system, and ii) computing the transformation parameters 25 of the optimal rigid 3D transformation that best aligns the two sets. Once the parameters have been computed, they are used to transform both calculated 3D positioning features 23 and calculated 3D surface points 17 thus aligning them into the object coordinate system.

The input to the positioning features matcher 24 are the set of reference 3D positioning features 29, R, the set of calculated 3D positioning features 23, O, along with two sets of observed 2D positioning features 21, $P_1$ and $P_2$ which were also used by the 3D positioning features calculator 22, as explained above. Matching these sets is the problem of finding two subsets $O_m \subset O$ and $R_m \subset R$, containing N features each, such that all pairs of points $\overline{(o_i, r_i)}$ with $o_i \in O_m$ and $r_i \in R_m$ represent the same physical features. Finding these subsets is accomplished by finding the maximum number of segments of points $\overline{(o_i o_j; r_i r_j)}$ such that $$|\|o_i - o_j\| - \|r_i - r_j\|| \leq \epsilon \text{ for all } i,j \in \{1, \ldots, N\}, i \neq j, \quad (1)$$

where $\epsilon$ is a predefined threshold which is set to correspond to the accuracy of the sensing device. This constraint imposes that the difference in distance between a corresponding pair of points in the two sets be negligible.

This matching operation is solved as a combinatorial optimization problem where each segment of points from the set O is progressively matched against each segment of points in the set R. Each matched segment is then expanded by forming an additional segment using the remaining points in each of the two sets. If two segments satisfy the constraint (1), a third segment is formed and so on as long as the constraint is satisfied. Otherwise the pair is discarded and the next one is examined. The solution is the largest set of segments satisfying (1). Other algorithms (see M. Fischler and R. Bolles, (1981) "Random sample consensus: A paradigm for model fitting with applications to image analysis and automated cartography", Communications of the Assoc. for Computing Machinery, (June 1981), vol. 24, no. 6, pp. 381-395.) can be used for the same purpose.

As long as the number of elements in the set of reference 3D positioning features 29 is relatively low (typically less than fifteen), the computational complexity of the above approach is acceptable for real-time operation. In practice however, the number of reference 3D positioning features 29 can easily reach several hundreds. Since the computational complexity grows exponentially with the number of features, the computation of corresponding features becomes too slow for real-time applications. The problem is solved by noting that the number of positioning features that are visible from any particular viewpoint is small, being limited by the finite field of view of the sensing device.

This means that if the calculated 3D positioning features 23 can be matched against reference 3D positioning features 29, then the matched features from the reference set are located in a small neighborhood whose size is determined by the size of the set of calculated 3D positioning features 23. This also means that the number of points in this neighborhood should be small as well (typically less than fifteen). To exploit this property for accelerating matching, the above method is modified as follows. Prior to matching, a set of neighbouring features $[N_i]$ is created for each reference feature. After the initial segment of points is matched, it is expanded by adding an additional segment using only points in the neighborhood set $[N_i]$ of the first matched feature. By doing so, the number of points used for matching remains low regardless of the size of the set of reference 3D positioning features 29, thus preventing an exponential growth of the computational complexity.

Alternatively, exploiting spatial correlation of sensing device position and orientation can be used to improve matching speed. By assuming that the displacement of the sensing device is small with respect to the size of the set of positioning features, matching can be accomplished by finding the closest reference feature for each observed positioning feature. The same principle can be used in 2D, that is, by finding closest 2D positioning features.

Once matching is done, the two sets need to be aligned by computing the optimal transformation parameters [M T], in the least-squares sense, such that the following cost function is minimized:

$$\sum_{i=1}^{N} \|r_i - Mo_i + T\|^2, \text{ for all } i \in \{1, \ldots, N\}. \quad (2)$$

The transformation parameters consist of a 3×3 rotation matrix M and a 3×1 translation vector T. Such a transformation can be found using dual quaternions as described in M. W. Walker, L. Shao and R. A. Volz, "Estimating 3-D location parameters using dual number quaternions", CVGIP: Image Understanding, vol. 54, no. 3, November 1991, pp. 358-367. In order to compute this transformation, at least three common positioning features have to be found. Otherwise both positioning features and surface points are discarded for the current frame.

An alternative method for computing the rigid transformation is to minimize the distance between observed 2D positioning features 21 and the projections of reference 3D positioning features 29. Using the perspective projection transformation Π, the rigid transformation [M T] that is optimal in the least-squares sense is the transform that minimizes:

$$\sum_{i=1}^{N} \|\Pi M^{-1}(r_i - T) - p_i\|^2, \text{ for all } i, j \in \{1, \ldots, N\}, \quad (3)$$

where $p_i \in P_1$ or $p_i \in P_2$ are observed 2D features that correspond to the 3D observed feature $o_i \in O_m$. The rigid transformation [M T] can be found by minimizing the above cost function using an optimization algorithm such as the Levenberg-Marquardt method.

3D Positioning Features Transformer

Once the rigid transformation is computed, the 3D positioning features transformer 26 transforms the set of calculated 3D positioning features from the sensing device coordinate system 23 to the object coordinate system 27. The transformed 3D positioning features are used to update the set of reference 3D positioning features 29 in two ways. First, if only a subset of observed features has been matched against the set of reference 3D positioning features 29, the unmatched observed features represent newly observed features that are added to the reference set. The features that have been reobserved and matched can be either discarded (since they are already in the reference set) or used to improve, that is, filter the existing features. For example, all observations of the same feature can be summed together in order to compute the average feature position. By doing so, the variance of the measurement noise is reduced thus improving the accuracy of the positioning system.

3D Surface Point Transformer

The processing steps for the surface points are simple once the positioning features matcher 24 makes the transformation parameters 25 available. The set of calculated 3D surface points in the sensing device coordinate system 17 provided by the 3D surface point calculator 16 are then transformed by the 3D surface point transformer 18 using the same transformation parameters 25 provided by the positioning features matcher 24, which is the main link of information between the positioning subsystem and the integration of surface points in the object coordinate system. The resulting set of transformed 3D surface points in the object coordinate system 19 is thus naturally aligned in the same coordinate system with the set of reference 3D positioning features 29. The final set of 3D surface points 19 can be visualized or preferably fed to a surface reconstructor 20 that estimates a continuous non-redundant and possibly filtered surface representation 31 that is displayed, on a user interface display 30, optionally with the superimposed set of reference 3D positioning features 29.

Figure 2:
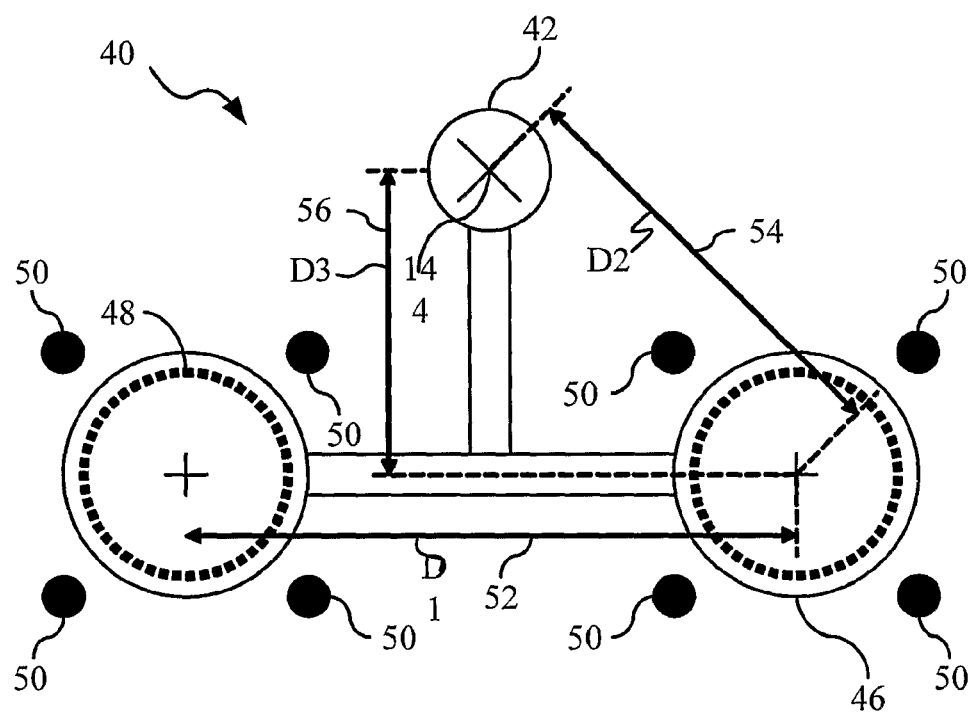
FIG. 2 depicts a configuration of an apparatus for three-dimensional surface scanning in accordance with the present invention.

Having described the system, a closer view of the sensing device is now detailed. FIG. 2 illustrates a front view of a sensing device 40 that is used in this preferred embodiment of the system. The device comprises two objectives and light detectors 46 that are typically progressive scan digital cameras. The two objectives and light detectors 46 have their centers of projection separated by a distance D1 52, namely the baseline, and compose a passive stereo pair of light detectors. The laser pattern projector 42 is preferably positioned at a distance D3 56 from the baseline of the stereo pair to compose a compact triangular structure leading to two additional active sensors, themselves composed in the first case by the left camera and the laser pattern projector and, in the second case by the right camera and the laser pattern projector. For these two additional active stereo pairs, the baseline D2 54 is depicted in the figure.

In FIG. 2, besides the laser pattern projector, the sensing device further comprises light sources for positioning. These are two sets of LEDs 50 distributed around the light detectors 46. These LEDs illuminate retro-reflective targets that are used as positioning features. The LEDs are preferably positioned as close as possible to the optical axes of the cameras in order to capture a stronger signal from the retro-reflective targets. Interference filters 48 are mounted in front of the objectives. These filters attenuate all wavelengths except for the laser wavelength that is matched to the LEDs' wavelength. This preferred triangular structure is particularly interesting when D3 56 is such that the triangle is isosceles with two 45 degree angles and a 90 degree angle between the two laser planes of the crosshair 44. With this particular configuration, the crosshair pattern is oriented such that each plane is aligned with both the center of projection of each camera as well as with the center of the light detectors. This corresponds to the center epipolar line where the main advantage is that one laser plane (the inactive plane) will always be imaged as a straight line at the same position in the image, independently of the observed scene. The relevant 3D information is then extracted from the deformed second plane of light in each of the two images. The whole sensing device is thus composed of two laser profilometers, one passive stereo pair and two modules for simultaneously capturing retro-reflective targets. This preferred configuration is compact.

For a hand-held device, the baseline D1 will be typically around 200 mm for submillimeter accuracy at a standoff distance of 300 to 400 mm between the sensing device and the object. By scaling D1, distances D2 automatically follow. Although this arrangement is particularly useful for simplifying the discrimination between the 2D positioning features and the projected laser pattern in the images, integrating a stereo pair and eventually one or more additional cameras for a better discrimination and accuracy, makes it possible to process images where a different laser pattern is projected. Grids and circular patterns are relevant examples. Another possibility is to increase or decrease D3 for more or less accuracy while losing the advantage of simplified image processing. While a linear configuration (i.e. D3=0) would not provide all the advantages of the above described configuration, it is still one option.

Figure 3:
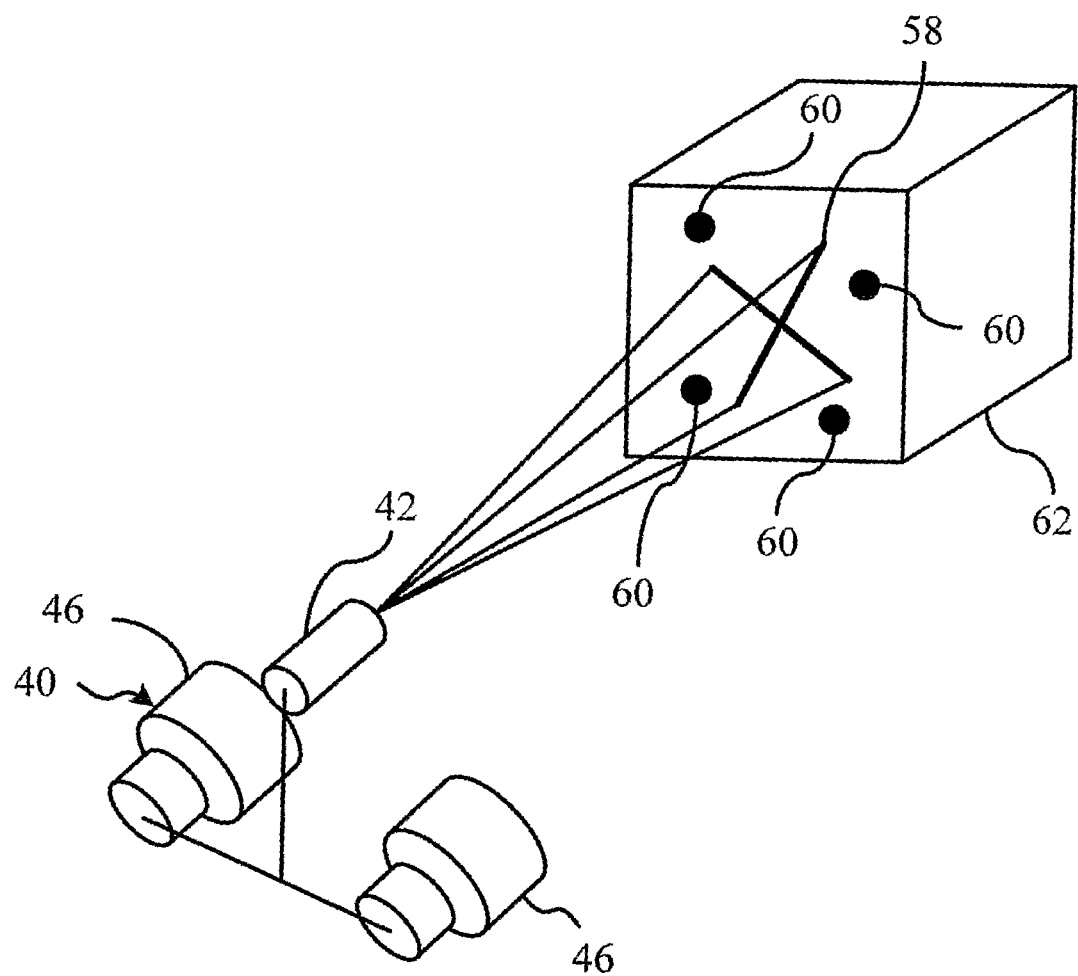
FIG. 3 illustrates a configuration of the apparatus depicted in FIG. 2 along with the object to be measured during acquisition, in accordance with the present invention.

FIG. 3 illustrates a 3D view of the sensing device while observing an object to be measured 62. One can see the formerly described compact triangular architecture comprising two cameras with objectives 46 and a crosshair laser pattern projector 42. The sensing device captures the image of the projected pattern 58 including a set of positioning features 60.

While illustrated in the block diagrams as groups of discrete components communicating with each other via distinct data signal connections, it will be understood by those skilled in the art that the preferred embodiments are provided by a combination of hardware and software components, with some components being implemented by a given function or operation of a hardware or software system, and many of the data paths illustrated being implemented by data communication within a computer application or operating system. The structure illustrated is thus provided for efficiency of teaching the present preferred embodiment.

One skilled in the art should understand that the positioning features, described herein as retro-reflective targets, could alternatively be provided by light sources, such as LEDs, disposed on the surface of the object to be scanned or elsewhere, or by any other means that provide targets to be detected by the sensing device. Additionally, the light sources provided on the sensing device could be omitted if the positioning features themselves provide the light to be detected by the cameras.

It should be understood that the pattern projector hereinabove described as comprising a laser light source could also use a LED source or any other appropriate light source.

It will be understood that numerous modifications thereto will appear to those skilled in the art. Accordingly, the above description and accompanying drawings should be taken as illustrative of the invention and not in a limiting sense. It will further be understood that it is intended to cover any variations, uses, or adaptations of the invention following, in general, the principles of the invention and including such departures from the present disclosure as come within known or customary practice within the art to which the invention pertains and as may be applied to the essential features hereinbefore set forth, and as follows in the scope of the appended claims.

The invention claimed is:

1. A method for obtaining three-dimensional surface points of an object in an object coordinate system, comprising:
providing a set of target positioning features on said object,
each of said target positioning features being provided at a fixed position on said object, said object coordinate system being defined using said target positioning features, said target positioning features being provided by one of a set of external fixed projectors projecting said features and fixedly secured features;

in a first group of steps:
    acquiring at least a pair of 2D first images of said object by at least a pair of cameras, at least a first portion of said set of target positioning features being apparent on said pair of first images, each said pair of said 2D first images being acquired from a corresponding first pair of viewpoints referenced in a sensing device coordinate system;

using an electronic chip in communication with said at least said pair of cameras for implementing the steps of:
    extracting, from said 2D first images, at least two first sets of 2D positioning features from a reflection of said target positioning features of said first portion on said surface;
    calculating a first set of calculated 3D positioning features in said sensing device coordinate system using said first sets of 2D positioning features;
    computing first transformation parameters for characterizing a current spatial relationship between said sensing device coordinate system and said object coordinate system, by matching corresponding features between said first set of calculated 3D positioning features in said sensing device coordinate system and a set of reference 3D positioning features in said object coordinate system, said reference 3D positioning features being cumulated from previous observations;
    transforming said first set of calculated 3D positioning features into a first set of transformed 3D positioning features in said object coordinate system using said first transformation parameters;
    cumulating said first set of transformed 3D positioning features to provide and augment said set of reference 3D positioning features;

in a second group of steps:
    providing a projected pattern on a surface of said object using a pattern projector;
    acquiring at least a pair of 2D second images of said object by said cameras, said projected pattern and at least a second portion of said set of target positioning features being apparent on said pair of second images, each said pair of said 2D second images being acquired from a corresponding second pair of viewpoints referenced in said sensing device coordinate system;
    wherein said first portion of said set of target positioning features and said second portion of said set of target positioning features being one of the same, partly the same or different;

using said electronic chip for implementing the steps of:
    extracting, from said 2D second images, at least one set of 2D surface points from a reflection of said projected pattern on said surface, and at least two second sets of 2D positioning features from a reflection of said target positioning features of said second portion on said surface;
    calculating a set of 3D surface points in said sensing device coordinate system using said set of 2D surface points;
    calculating a second set of calculated 3D positioning features in said sensing device coordinate system using said second sets of 2D positioning features;
    computing second transformation parameters for characterizing a current spatial relationship between said sensing device coordinate system and said object coordinate system, by matching corresponding features between said second set of calculated 3D positioning features in said sensing device coordinate system and said set of reference 3D positioning features in said object coordinate system;
    transforming said set of 3D surface points into a set of transformed 3D surface points in said object coordinate system using said second transformation parameters.

2. The method as claimed in claim 1, further comprising, in said second group of steps:
    transforming said second set of calculated 3D positioning features into a second set of transformed 3D positioning features in said object coordinate system using said second transformation parameters;
    cumulating said second set of transformed 3D positioning features to provide and augment said set of reference 3D positioning features.

3. The method as claimed in claim 1, wherein, in said second group of steps, said electronic chip further implements the step of cumulating said set of transformed 3D surface points to provide a 3D surface model of said object.

4. The method as claimed in claim 1, wherein said positioning features are fixedly secured on said surface of said object.

5. The method as claimed in claim 4, wherein said positioning features are retro-reflective targets, said method further comprising illuminating at least part of said set of positioning features by a light source.

* * * * *